March 21, 1933.  W. G. ELDER  1,902,435
FILTER
Filed July 13, 1931  2 Sheets-Sheet 1
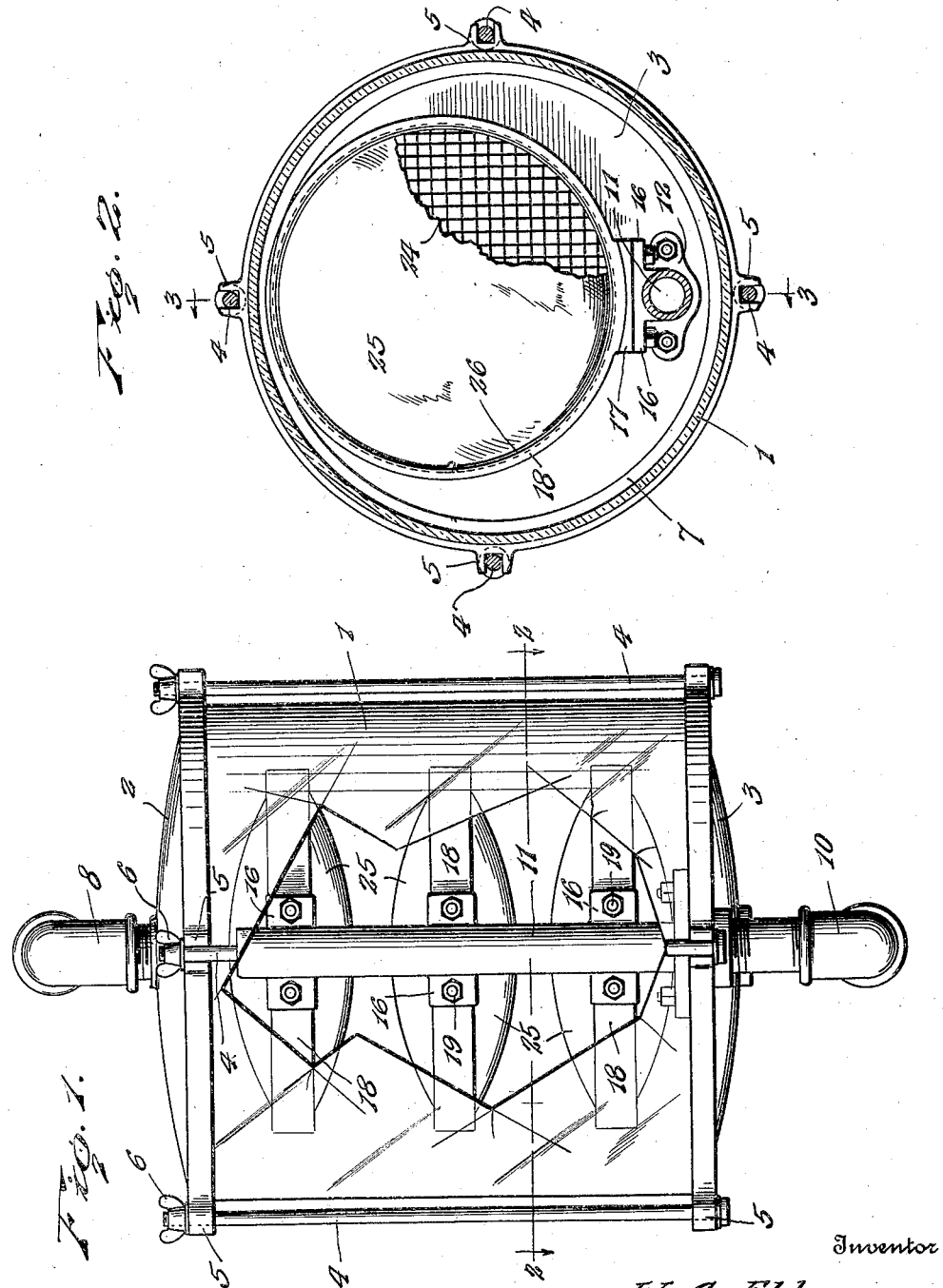
Inventor
W. G. Elder.
By Lacey & Lacey,
Attorneys

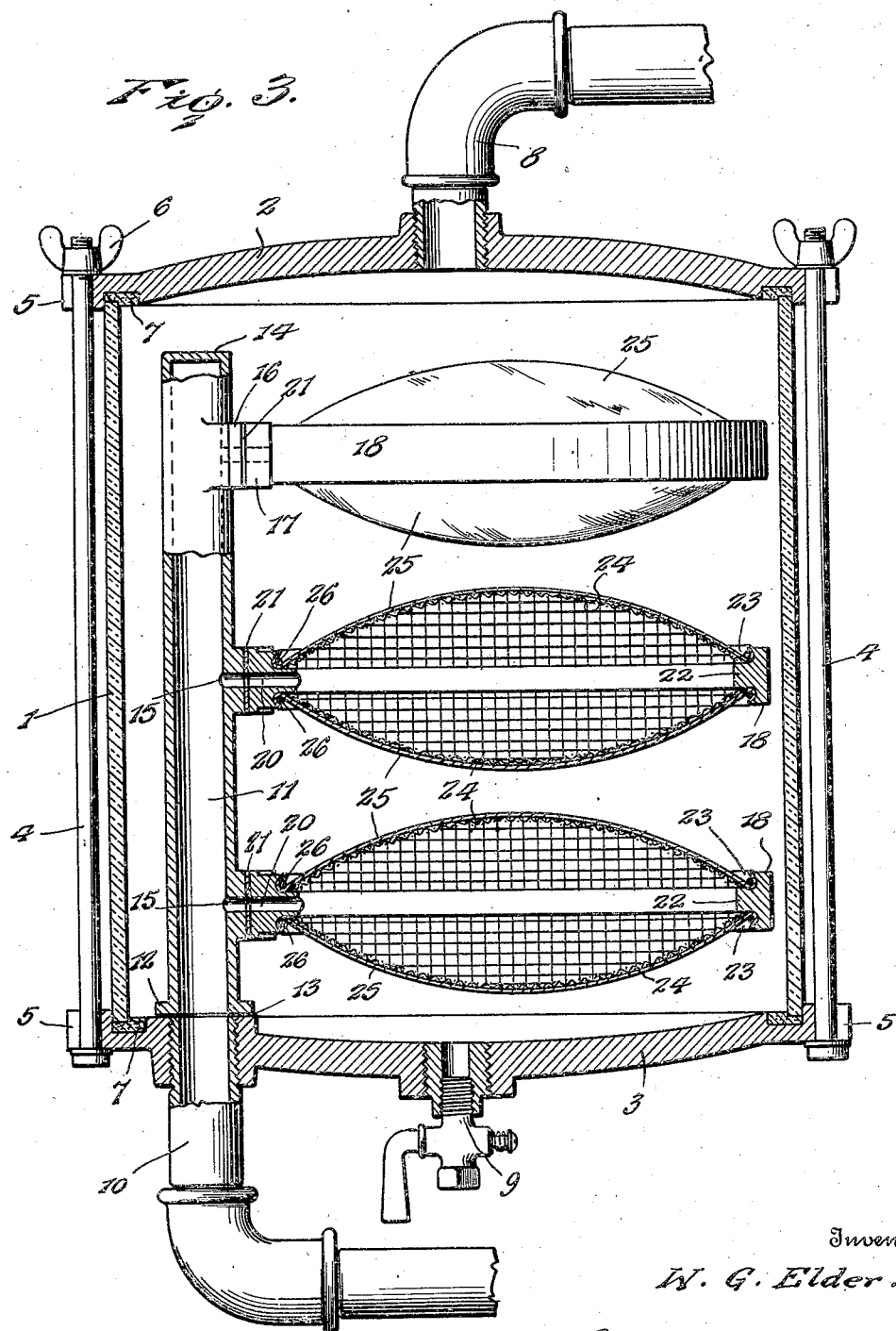

Patented Mar. 21, 1933

1,902,435

UNITED STATES PATENT OFFICE

WILLIS G. ELDER, OF WEST SOMERVILLE, MASSACHUSETTS

FILTER

Application filed July 13, 1931. Serial No. 550,533.

This invention relates to filters and is intended more particularly for use in filtering gasoline supplied to internal combustion engines. The object of the invention is to provide a simple, compact, inexpensive and efficient filter whereby water and foreign matter will be removed from the gasoline before the gasoline enters the fuel tank of the engine, and also to provide a filter having the stated characteristics, which will be easily assembled and accessible for cleaning or making repairs. The invention is illustrated in the accompanying drawings and will be hereinafter first fully described and then more particularly defined in the appended claim.

In the drawings,

Figure 1 is a side elevation, partly broken away, of a filter embodying the invention, Fig. 2 is a horizontal section on the line 2—2 of Fig. 1, and Fig. 3 is a vertical section on the line 3—3 of Fig. 2.

In carrying out the invention, there is provided a casing consisting of a cylinder 1 of glass or other transparent rigid material, and upper and lower heads 2 and 3 which are preferably of metal and are clamped to the ends of the cylinder by long bolts 4 fitted through notched lugs 5 on the respective heads and equipped with wing nuts 6 whereby the bolts may be secured in place and the heads held to the ends of the cylinder. The heads 2 and 3 are provided in their inner opposed faces with annular grooves receiving gaskets 7 of leather, rubber, or other suitable material, whereby leakage will be prevented and the end edges of the glass cylinder will be protected against chipping or breaking. An inlet pipe 8 has one end threaded into the upper head 2 and leads from a source of supply, while, in the lower head, there is fitted centrally a drain cock 9 whereby sediment and collected water may be drawn from the filter.

An outlet pipe 10 is fitted to and leads from the lower head 3 adjacent the edge of the head and carries the filtered gasoline to the fuel tank or other place of deposit. Within the cylinder, a stand pipe 11 is disposed in axial alinement with the end of the outlet pipe and, at its lower end, is provided with attaching lugs or flanges 12 through which securing bolts are inserted into the bottom head whereby the stand pipe will be secured in position and held in proper relation to the outlet pipe. A washer or packing 13 is inserted between the lower end of the pipe and the head to prevent leakage, and the upper end of the stand pipe is closed, as indicated at 14. At intervals in the height of the stand pipe, openings 15 are formed in its side, and lugs 16 are formed thereon at the sides of the respective openings. Mating with and secured to said lugs are flattened enlargements 17 on the sides of rings 18, and securing bolts 19 are engaged with the lugs 16 and 17 whereby the rings will be securely held in position on the side of the stand pipe. Openings 20 are formed through the rings and the lugs 17 to aline with the openings 15 in the side of the stand pipe, and packing 21 is interposed between the lugs 16 and 17 to prevent leakage. The rings 18 are each formed on their inner circumferences with medial ribs 22, and in the upper and lower surfaces of said ribs are grooves or annular recesses 23 receiving the peripheral margins of woven wire frames 24, said frames being dished so as to present convex surfaces above and below the respective rings to support and impart proper shape to filtering cloths 25, which are preferably chamois skin or similar material. The edges of the several filtering cloths are folded to fit closely within the grooves or recesses 23, and split resilient retaining rings 26 are sprung into the respective recesses over the edges of the cloths so that the cloths will be stretched taut over the woven frames and will be retained thereon.

The construction and arrangement of the several parts being thus made known, it is thought the operation will be readily understood and appreciated. The gasoline to be filtered is fed into the filter through the inlet pipe 8 and will accumulate within the cylinder 1 until the supply is cut off or it reaches such a level that it will cover the end of the pipe 8 and thereby automatically arrest further flow. The liquid will obviously pass around the several filter disks consisting of the wire frames and the filter cloth stretched over the same, and will seep through the filter cloth and will then pass out through the openings 20 and 15 to the stand pipe, whence it will flow into and through the outlet pipe 10 in an obvious manner. The chamois skin will permit the gasoline or other light liquid to pass therethrough, but the water and heavier liquids will not pass through such cloth but will be retained within the cylinder, together with all solid matters which may possibly be present in the gasoline. The cylinder 1, being of transparent material, will permit the condition of the liquid within the cylinder to be observed at all times, and the glass will be preferably tinted so as to guard against discoloration of the gasoline, it being well known that sunlight passing through clear glass tends to discolor gasoline. Should it become necessary to clean or renew any of the parts of the filter, the flow of gasoline is cut off at the source of supply, and the drain cock 9 may then be opened so that all accumulated sediment and water within the cylinder will escape. Access to the several filtering disks may be very easily and quickly obtained by releasing the bolts 4, whereupon the heads 2 and 3 may be separated from the cylinder 1 and the several filtering disks mounted upon the stand pipe thereby exposed. Should a filtering cloth need renewal, the retaining ring 26, which holds the same in place, is released, whereupon the cloth may be lifted from the open work supporting frame and cleaned or renewed, as may be necessary. The device is simple in construction and compact in its arrangement. It is not apt to get out of order and has been found highly efficient in actual use.

Having thus described the invention, I claim:

A filter comprising a casing, a stand pipe within the casing, the casing being provided with an inlet at one end and with an outlet at its opposite end alined with the stand pipe and the stand pipe having an opening through its side and having flattened lugs at the sides of said opening, a ring having an opening alined with the opening in the stand pipe and having flattened lateral projections at the sides of said opening bearing against the flattened lugs on the stand pipe and being further provided in its upper and lower sides with annular grooves, fastening devices inserted through the flattened projections on the ring into the lugs on the stand pipe, reticulated frames having their edges disposed within the respective grooves in the ring and their areas bowed from the ring, filtering cloths extending over said frames with their edges fitted in the grooves in the ring, and retainers engaged in the edge portions of the filtering cloths to stretch the same over the reticulated frames and secure the cloths in the grooves in the ring.

In testimony whereof I affix my signature.

WILLIS G. ELDER. [L. S.]